United States Patent
Ursel et al.

[11] 3,825,971
[45] July 30, 1974

[54] WIPER FOR WIPING ADJACENT SURFACES

[75] Inventors: Eckhard Ursel, Buhl; Horst Seibicke, Altschweier, both of Germany

[73] Assignee: Robert Bosch, GmbH, Stuttgart, Germany

[22] Filed: June 7, 1972

[21] Appl. No.: 260,386

[30] Foreign Application Priority Data
June 28, 1971  Germany .............................. 247535
Feb. 16, 1972  Germany ............................ 2207103

[52] U.S. Cl. ......... 15/250.27, 15/250.16, 15/250.35
[51] Int. Cl. ............................................. B60s 1/28
[58] Field of Search ....... 15/250.13, 250.16, 250.22, 15/250.3, 250.27, 250.35, 250.36

[56] References Cited
UNITED STATES PATENTS

| | | | |
|---|---|---|---|
| 2,100,055 | 11/1937 | Horton | 15/250.22 X |
| 2,256,477 | 9/1941 | Herzog | 15/250.3 |
| 2,257,789 | 10/1941 | Hoffman | 15/250.32 |
| 2,973,541 | 3/1961 | Beck | 15/250.15 |
| 3,058,142 | 10/1962 | Pollock | 15/250.02 |
| 3,402,418 | 9/1968 | Le Roy | 15/250.01 |
| 3,447,187 | 6/1969 | Barrett | 15/250.16 |
| 3,456,278 | 7/1969 | Mandy et al. | 15/250.02 |
| 3,493,804 | 2/1970 | Fennel | 15/250.22 |

FOREIGN PATENTS OR APPLICATIONS 1,151,821  8/1957  France .............................. 15/250.3

*Primary Examiner*—Peter Feldman
*Attorney, Agent, or Firm*—Michael S. Striker

[57] ABSTRACT

A wiper for simultaneously wiping two adjacent circular surfaces, has a shaft spaced from a plane passing through the axes of the two surfaces. The shaft is parallel to the plane and supports a bell crank whose two levers form an angle of less than 180° with each other and which constitute two wiper arms to which wiper blades are connected. An oscillatory drive means rotates the shaft between two angular end positions to sweep the surfaces which are simultaneously wiped by the wiper blades.

12 Claims, 5 Drawing Figures

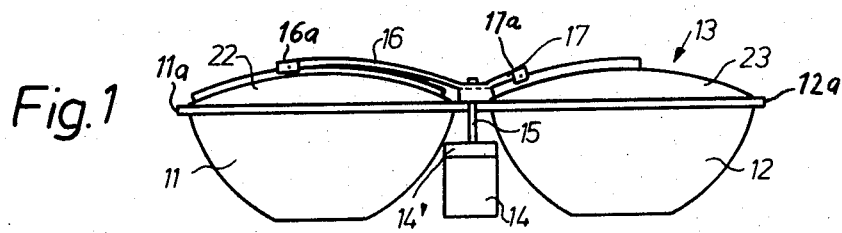
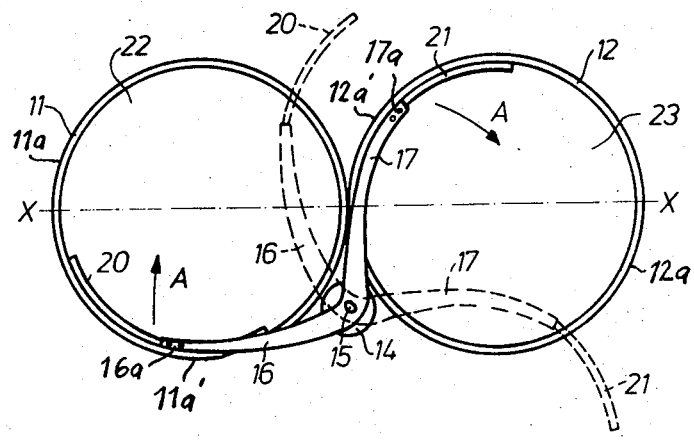
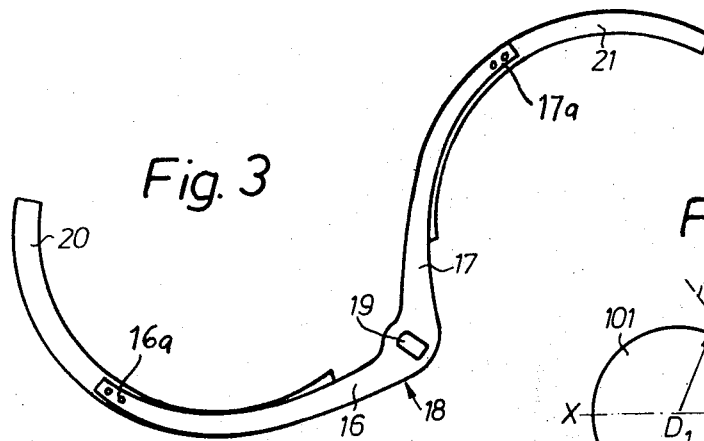
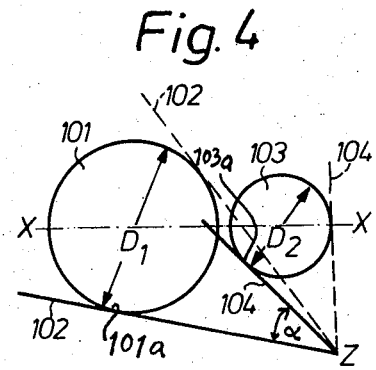

WIPER FOR WIPING ADJACENT SURFACES

BACKGROUND OF THE INVENTION

The present invention relates to an apparatus for wiping of surfaces, and particularly to a wiping apparatus for simultaneously wiping a plurality of substantially adjacent circular surfaces. The present invention is particularly useful for wiping the exposed surfaces of lenses of closely adjacent headlights of automobile vehicles.

Wiper arrangements for wiping the exposed surfaces of lenses of closely adjacent headlights are already known. The known wiper devices utilize a wiper arm and wiper blade for each exposed lens surface to be wiped. In accordance with one known device of this type, the shaft which carries the wiper arms is located or positioned in the plane of symmetry which passes through the two surfaces or optical axes of the headlights. In this manner, simultaneous wiping fields have been achieved during the rotation of the shaft. By oscillating the shaft between two angular positions, substantially the entire surfaces of the exposed headlight lenses are wiped without the blades having to pass over the lens rims. The just described known arrangement has its disadvantages. To begin with, it results in a complicated assembly which is difficult and expensive to manufacture. Additionally, the installation of the assembly, which must be placed between two adjacent headlights, is likewise complicated and in many cases impractical. The reason for this is that the shaft is positioned at the narrowest position between the headlights. Additional problems are encountered in the servicing of the headlights or the wiper assembly, it often being necessary to disassemble one when the other needs maintenance or repair.

SUMMARY OF THE INVENTION

Accordingly, it is an object of the present invention to provide an apparatus for simultaneously wiping a plurality of adjacent surfaces which does not have the disadvantages known in the prior art with respect to such devices.

It is another object of the present invention to provide a wiper apparatus of the type under discussion which is simple in construction and economical to manufacture and which can easily be installed in motor vehicles.

It is still another object of the present invention to provide an apparatus as described above which is suitable for wiping adjacent headlights and which can be positioned at a distance spaced from a plane of symmetry which passes through the centers of the headlights.

It is a further object of the present invention to provide a wiper assembly of the type under discussion which is not positioned in the narrowest portion between two adjacent headlights and which can cooperate with headlights having different diameters.

With the above objects in view, the apparatus in accordance with the present invention is one for simultaneously wiping a plurality of substantially adjacent circular surfaces, particularly for wiping exposed surfaces of lenses of closely adjacent headlights of automotive vehicles, said apparatus comprising a carrier means pivotable about a pivoting axis spaced a distance from and substantially parallel to a plane passing through the axes of a pair of said surfaces to be wiped. Supporting arms are provided which are connected to said carrier means and turnable together with the same. A pair of wiper blades are provided, and two mounting means are used for connecting said wiper blades to said supporting arms and are arranged on said supporting arms so that lines connecting each of said mounting means with said pivoting axis form with each other an angle of less than 180°. Drive means are provided for oscillating said carrier means together with said mounting means and said wiper blades about said pivoting axis so that said wiper blades wipe the corresponding circular surfaces.

In accordance with the presently preferred embodiment, said carrier means comprises a bell crank and said supporting arms constitute the levers of the bell crank and form an angle of less than 180° with each other.

The novel features which are considered as characteristic of the invention are set forth in particular in the appended claims. The invention itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWINGS

FIG. 1 is a schematic side view of a light unit consisting of two headlights in a motor vehicle and showing the wiper apparatus in accordance with the present invention;

FIG. 2 is a top view of the unit shown in FIG. 1 and showing two different positions of the wiper arms;

FIG. 3 is an enlarged view of the wiper arm and wiper blade assembly shown in FIG. 2;

FIG. 4 is a schematic representation of a lighting unit having two headlights having different diameters and also showing the pivot point and the angular relationship of the two wiper arms for such a lighting unit.

DESCRIPTION OF THE PREFERRED EMBODIMENTS

Figure 5:
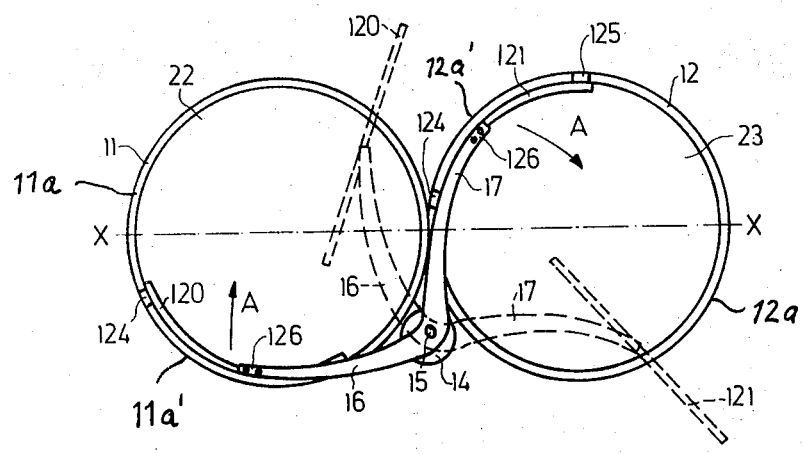
FIG. 5 is another embodiment of the wiping apparatus shown in FIGS. 1 and 2.

Referring now to the Figures, wherein the same reference numerals have been utilized to identify similar parts, and first referring to FIG. 1, two round vehicle headlights 11 and 12 are shown to make up a light unit 13 which is commonly installed as an assembly. The headlight 11 is secured within a headlight rim 11a while the headlight 12 is likewise secured within a headlight rim 12a.

The wiping apparatus in accordance with the present invention will be described in connection with such a lighting unit described above, although it will become apparent that the present invention can equally well be utilized whenever any two adjacent surfaces are to be simultaneously wiped. Thus, the presently preferred embodiment has a driving motor 14 which represents the driving means of the wiper apparatus. Connected to the motor 14 is a reversing or reciprocating gear 14' which is coupled to a shaft 15, whereby the latter oscillates in response to the rotation of the motor 14 as a result of the reciprocal action of the gear 14'. Such an oscillatory arrangement is merely illustrative, and any other device which can cause the shaft 15 to oscillate about its axis can be used.

The free end of the shaft 15 is connected with two wiper arms 16 and 17. The wiper arms 16 and 17 are connected to a bell crank lever 18, which can best be seen in FIG. 3. An opening 19 is provided in the bell crank lever at its pivot axis, the opening being so configurated so that it matches the outside shape of the shaft 16 to thereby engage the same and share the oscillatory movements of the shaft 15 about the axis of the latter.

The wiper arms 16 and 17 include an angle of approximately 90° with each other, as can best be seen in FIG. 3. The selection of the angle between the wiper arms will be more fully described in connection with FIG. 4.

Referring to the FIGS. 1–3, the free ends of the wiper arms 16 and 17 are seen to be connected to wiping blades 20 and 21, respectively, by means of pivot connectors 16a and 17a. The wiper blades are connected to the wiper arms in a conventional manner, this connection commonly being one whereby the wiper blades have limited freedom of movement in a first direction while being free to move in a second direction.

The headlights 11 and 12 have headlight lenses 22 and 23 the exposed surfaces of which are to be wiped by the wiper blades 20, 21. By selecting the wiper arms 16 and 17 to be made of a spring material, and appropriately configurating the wiper arms, the pivoted mounting of the wiper blades 20 and 21 on the wiper arms 16 and 17 insures that the wiper blades remain in intimate contact with the exposed surfaces in all of the angular positions of the shaft 15. The pivoting arrangements for mounting the wiper blades onto the wiper arms are well known, as are the materials suitable for the wiper arms which will create such a biasing force in the direction of the exposed lens surfaces.

As can best be seen in FIG. 2, the shaft 15 does not lie in the plane of symmetry which passes through the axis of the headlights 11 and 12, the plane of symmetry being designated by the line X—X. According to one advantageous feature of the present invention, the shaft 15 is spaced a distance from the plane X—X. By so moving the shaft to one side of the plane, it will be noted that the wiper assembly can be mounted in a space between two headlights, which space would normally not be utilized. Thus, the wiper assembly, and particularly shaft 15, are not provided in the narrowest portion between the headlights 11 and 12, namely along the plane X—X.

Referring to FIGS. 1 and 2, the headlight rims 11a and 12a have respective rim portions 11a' and 12a' which are located at one of the angular end positions of the wiper arms 16 and 17. Thus, the shaft 15 oscillates the wiper arms 16 and 17 between the two angular positions. In one position, the wiper arm 16 is in the region of the rim portion 11a' while the wiper arm 17 is in the region of the rim portion 12a'. The other angular end positions of the wiper arms are shown in outline in FIG. 2. When the wiper assembly is not being utilized, the wiper arms 16 and 17 are preferably brought to a rest position whereby they are in the region of the rim portions 11a' and 12a', respectively, so that they do not cover part of the headlight lenses 22 and 23. With the rim portions 11a' and 12a' as reference points, it is clear, referring to FIG. 2, that oscillatory movements of the wiper arms will sweep corresponding fields on the headlight lenses 22 and 23. To further insure that the wiper arms 16 and 17 do not interfere with the passage of light through the headlight lenses 22 and 23, the wiper arms 16 and 17 are configurated in such a manner as to match the headlight rims 11a and 12a, particularly in the regions of the rim portions 11a' and 12a'. In this manner, during the rest position of the wiper assembly, the wiper arms 16 and 17 lie along the headlight rims 11a and 12a as shown in FIG. 2.

As suggested above, the wiper arms 16 and 17 are preferably biased, while mounted on the shaft 15, in the direction towards the headlight lenses 22 and 23 to insure that the wiper blades 20 and 21 remain in intimate contact with the lens surfaces. The design of the wiper arms 16 and 17 to accomplish this result is well known in the art and need not be described in detail. The wiper blades 20 and 21, normally being of a flexible elastic material, are urged against the lens surfaces by the biasing force of the wiping arms 16 and 17, so that the wiper blades make contact with the lens surfaces in all angular positions of the shaft 15, even if the headlights 11 and 12 are somewhat warped or not placed perfectly into the lighting unit 13 so that the optical axes of the two headlights are not perfectly parallel to one another. Of course, one common method of achieving the above described characteristics, is to make the wiper arms 16 and 17 from a rigid but somewhat resilient material, such as spring steel and configurated in such a manner as to be bent in the direction of the headlight lenses 22 and 23.

As described above, the operation of the wiper apparatus is such that in the rest or initial position, the wiper arms 16 and 17 are positioned in the regions of the rim portions 11a' and 12a', respectively. Once the motor 14 is energized, the wiper arms move in a direction which is generally indicated by the arrows A in FIG. 2 until the wiper arms reach the position as shown by the dashed outline. At such a time, the reversing gear 14' causes a reversal of direction to cause the wiper arms to return to their initial position. This oscillating motion continues for the duration during which wiping action is desired.

The wiper blades illustrated in FIGS. 1–3 have also been shown to be configurated to correspond to the shape of the headlight rims 11a and 12a, so that, as described above, in the rest position of the wiper assembly, both the wiper arms as well as the wiper blades are positioned along the rims without blocking any of the transmitting surfaces of the headlight lenses 22 and 23. To accomplish this, the wiper blades 20 and 21 can be provided with a rigid supporting rib which is connected to the wiper arms and which maintains the shape of the wiper blades as shown in FIGS. 2 and 3. Alternatively, the wiper blades 20 and 21 may be provided with a stiff elongated member which passes through the body of the blade.

Instead of providing curved blades, as described above in connection with FIGS. 2 and 3, it is also possible to provide straight flexible blades 120 and 121, as shown in FIG. 5. While such blades may be less complicated to manufacture, the second embodiment illustrated in FIG. 5 is preferably provided with stops 124 and 125 which are positioned along the rims 11a and 12a in the regions of the rim portions 11a' and 12a'. With this arrangement, the advantages achieved with the preferred described embodiment are also obtained, namely when the wiper arms 16 and 17 move into the region of the rim portions 11a' and 12a' the ends of the wiper blades 120 and 121 engage and are deformed by the stops 124 and 125 to conform with the rims 11a and 12a. To achieve the deformation as shown in FIG. 5, the wiper blades 120 and 121 are preferably provided in the interior of their flexible rubber wiper portions with a spring-like rod or member which has a rectangular cross section and whose wider side is arranged within the wiper blade to face the direction of wiping. Also, in this embodiment, the mounting means 126 connects the ends of the wiper arms 16 and 17 to the middle portions of the wiper blades 120 and 121. The stops 124 and 125 are so positioned along the rims 11a and 12a so that, when the mounting means 126 move into the region of the rim portions 11a' and 12a', the stops 124 and 125 abut against the end portions of the wiper blades 120 and 121.

The wiper blades 120 and 121 are suitable to wipe exposed surfaces which are either round or oval in shape. Accordingly, the present invention contemplates that stops 124 and 125 can be provided at both or opposite sides of the rims 11a and 12a, so that the wiper blades 120 and 121 assume the shape of the rims in both angular end positions of the shaft 15. In this manner, the invention is particularly useful since the deformation of the wiper blades in this manner assures that most of the area of the respective surfaces is wiped during each forward or reverse oscillation.

The principle of operation of the present invention is illustrated in FIG. 4. FIG. 4 also suggests a third embodiment wherein the diameters of the two circular surfaces to be simultaneously wiped are different from one another. Thus, an important feature of the present invention is to provide a wiping apparatus which can simultaneously wipe two adjacent circular surfaces but which apparatus need not be placed along the line which connects the centers of the surfaces, or, which does not need to be placed in the narrowest space between the adjacent surfaces. Although the following description is with respect to two surfaces 101 and 103 which are of different diameters, the description will equally be applicable to the embodiments described in connection with FIGS. 1–3 and 5. Thus, the headlights 101 and 103 have the centers of their surfaces lying on a line X—X. An axis about which the wiper arms 102 and 104 pivot is designated by reference character Z. At one angular end of rotation of the wiper arms, namely in the rest position of the wiper arms 101a and 103a, the wiper arms are substantially tangent to the surfaces. The distance of the pivot axis Z from each of the centers of the headlights 101 and 103 corresponds to or is proportional to the diameters of the respective headlights. Of course, when the two adjacent surfaces have two equal diameters, then the pivot axis Z is equally distant from each of the centers, as illustrated in FIGS. 2 and 5. It should be noted that the actual configuration of the wiper arms 102 and 104 is not critical for the purposes of the present invention, it only being important that the conditions which are illustrated in FIG. 4 are satisfied. While the elements designated by reference numerals 102 and 104 have been referred to as the wiper arms, this is not necessarily the case although, as a practical matter, such construction may be the most economical to build. In the event that the reference numerals 102 and 104 do not represent the wipers, then these lines merely represent the connecting lines between the pivot axis Z and the positions of the wiper blades during initial or rest positions. Once the diameters D1 and D2 have been determined, then the angle also can similarly be determined as soon as a suitable spacing of the pivot axis Z from the line X—X is selected. By such a location of the pivot axis Z, corresponding fields of the headlights 101 and 103 can be swept simultaneously while a convenient position for the pivot axis Z is provided which does not interfere with or complicate the assembly of the light unit 13.

In the above-described embodiment, the shaft 15, as suggested above, is not placed in the narrowest space between two adjacent surfaces. In fact, the convenience of installation and repairs as well as efficiency in operation is improved with movement of the shaft away from the symmetry plane.

Although the wiper arms 16 and 17 have been described as separate elements, the wiper arms can advantageously form part of the arms of a bell crank 18, best seen in FIG. 3. While the presently preferred embodiment provides that the wiper arms 16 and 17 are integral with the bell crank 18, this need not be the case, it only being important that said bell crank provides the required angle between the wiper arms, and provides the configurated arms as described above.

It will be understood that each of the elements described above, or two or more together, may also find a useful application in other types of a wiper apparatus differing from the types described above.

While the invention has been illustrated and described as embodied in apparatus for simultaneously wiping a plurality of substantially adjacent circular surfaces, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims.

1. Apparatus for simultaneously wiping a plurality of substantially circular adjacent surfaces, particularly for wiping the exposed lens surfaces of closely adjacent automotive vehicle headlights having arcuately curved rims which surround said surfaces, comprising carrier means pivotable about a pivoting axis spaced from and substantially parallel to a plane passing through the centers of a pair of said surfaces to be wiped; supporting arms connected to said carrier means and turnable with the same to and from respective rest positions in which each supporting arm is located adjacent to a portion of the respective rim, said supporting arms each being configurated so as to match the shape of said portion and to extend along the same in conformance therewith when in said rest position; a pair of wiper blades; a pair of mounting means for connecting said wiper blades to the respective supporting arms, and being arranged on the latter so that lines connecting each of said mounting means with said pivoting arms form with each other an angle of less than 180°; and drive means for oscillating said carrier means together with said mounting means and said wiper blades about said pivoting axis so that said wiper blades wipe the corresponding surfaces.

2. Apparatus as defined in claim 1, wherein each of said wiper blades is configured to match the shape of said portion.

3. Apparatus as defined in claim 1, wherein said portion comprises stop means, and wherein each wiper blade is flexible to thereby become deformed into the shape of said portion in response to engagement with said stop means.

4. Apparatus for wiping at least one surface of arcuately curved outline which is bounded by an arcuately curved rim, particularly the lens surface of an automotive vehicle headlight and for also wiping an additional surface of arcuately curved outline bounded by an arcuately curved additional rim and located closely adjacent the first-mentioned surface, comprising carrier means pivotabe about a pivot axis; a supporting arm connected to said carrier means and turnable with the same to and from a rest position in which said supporting arm is located adjacent to a portion of said curved rim, said supporting arm being configured to match the shape of said portion so as to extend along the same in conformance therewith when in said rest position; a wiper blade; mounting means mounting said wiper blade on said supporting arm for wiping movement over said surface in response to pivoting of said carrier means; an additional supporting arm also connected to said carrier means and turnable with the same to and from a rest position in which said additional supporting arm is located adjacent to a portion of said additional rim, said additional supporting arm being configured to match the shape of said additional rim; an additional wiper blade; and additional mounting means mounting said additional wiper blade on said additional arm.

5. Apparatus as defined in claim 4, wherein said mounting means connect said supporting arms and their respective wiper blades at a point approximately midway between said wiper blades.

6. Apparatus as defined in claim 4, wherein said supporting arms are connected to said carrier means, and said drive means comprises a single shaft connected to said carrier means for moving all said supporting arms simultaneously.

7. Apparatus as defined in claim 4, wherein said supporting arms and said carrier means are integral with one another.

8. Apparatus as defined in claim 4, wherein said supporting arms are configured so as to be biased in the direction of said surfaces.

9. Apparatus as defined in claim 8, wherein said supporting arms are made from a spring material, and wherein said wiper blades are flexible and are biased in the direction of said surfaces by said supporting arms into intimate contact with said surfaces.

10. Apparatus as defined in claim 4, wherein said carrier means comprises a bell crank, said supporting arm being one of the levers of the latter which form an angle of less than 180° with each other.

11. Apparatus as defined in claim 4, wherein each of said wiper blades is configured to match the shape of the respective rim portion.

12. Apparatus as defined in claim 4, wherein each rim portion comprises stop means; and wherein each of said wiper blades is flexible so as to become deformed to the shape of the respective rim portion in response to engagement with the respective stop means.

* * * * *